United States Patent Office 2,900,201
Patented Aug. 18, 1959

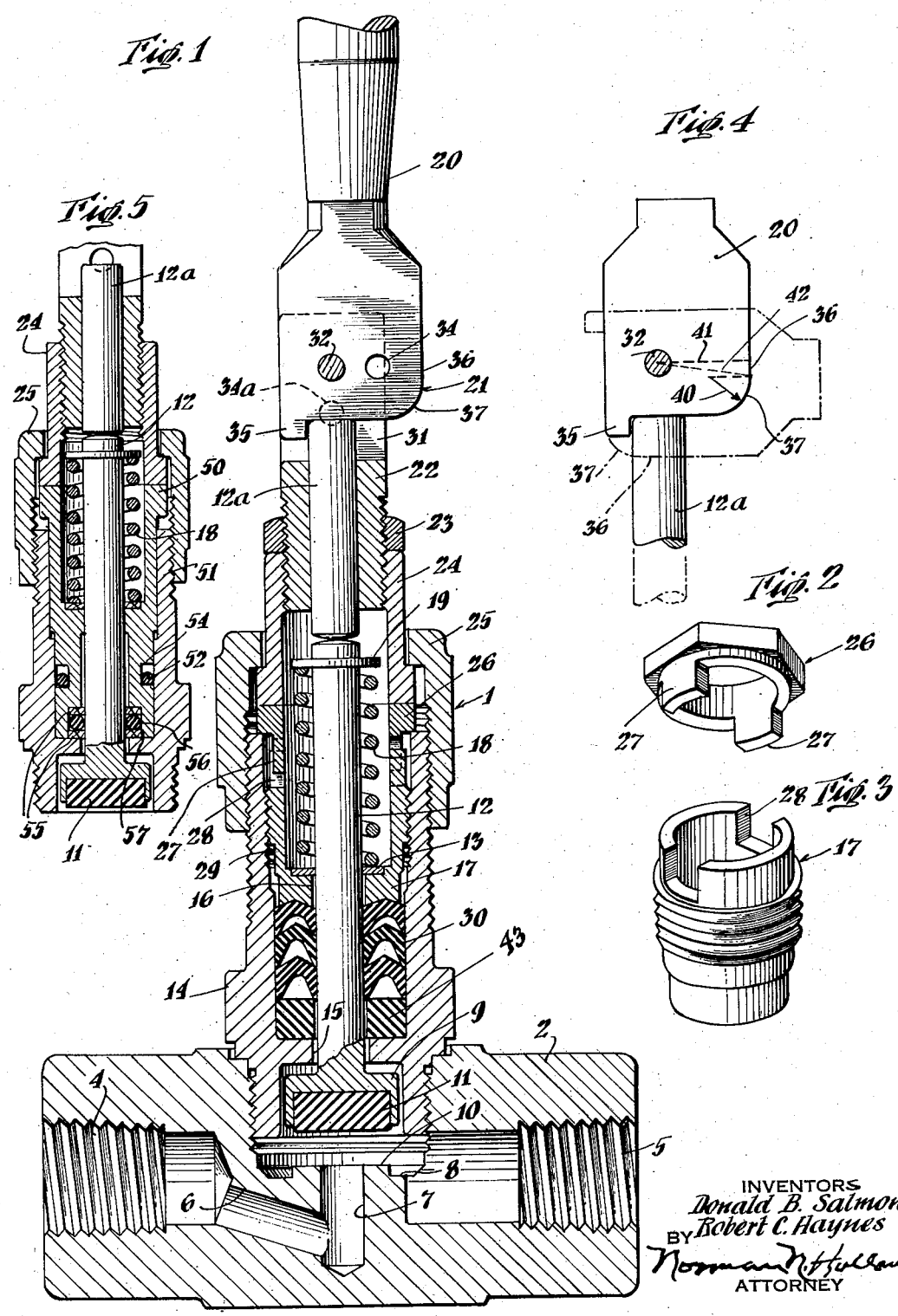

2,900,201

VALVE STEM PACKING

Donald B. Salmon, Englewood, N.J., and Robert C. Haynes, New York, N.Y., assignors to Hoke Incorporated, Englewood, N.J., a corporation of New York Application August 8, 1955, Serial No. 527,053

1 Claim. (Cl. 286—34)

The present invention relates to a fluid control valve and more particularly to a cam operated valve.

Cam operated fluid shut-off valves are particularly useful in applications where the fluid control requires a valve which is quick-acting and positive in its control. Known types of cam-operated valves have proven suitable for many low-pressure installations; however in installations using fluid at high pressures, they have proven unsatisfactory due to their tendency to leak through the valve packing or to force open against the cam closing action.

Accordingly, an object of the present invention is to provide an improved cam-operated valve.

Another object of the present invention is to provide a cam-operated valve suitable for use at high pressures.

Another object of the present invention is to provide a quick-acting valve which has a positive locking action in the closed position.

Another object of the present invention is to provide an improved cam type valve packing means.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a side elevational view partially in section of a cam-operated valve embodying the invention;

Fig. 2 is a perspective view of the packing sleeve lock-nut;

Fig. 3 is a perspective view of the packing sleeve;

Fig. 4 is a fragmentary elevational view of the handle portion of the valve of Fig. 1; and Fig. 5 is a fragmentary sectional view of another embodiment of the valve.

Referring to the drawing, the cam-operated valve 1 is shown having body 2 with inlet 4 and outlet 5 interconnected by conduits 6 and 7 and cavity 8. Washer 11 of valve member 9 is moved against valve seat 10 by the cam action, as will be more fully described below, to cut off flow between inlet 4 and outlet 5. Valve member 9 has an elongated stem 12, which is reciprocably mounted in guide 15 of valve bonnet 14 and in guide 16 of a packing sleeve 17 within bonnet 14. Spring 18, compressed between washer 19 on the top portion of stem 12 and dust washer 13, urges the valve member 12 toward its upward or open position.

Stem 12 is moved downwardly to close the valve by pivoted handle 20 whose cam surface 21 makes sliding contact with upper stem 12a as handle 20 is swung from a vertical position, as shown in Fig. 1, to a horizontal position, as is indicated by the dash-dot lines of Fig. 4. Stem 12a is slidably mounted in sleeve 22, which is threaded into upper bonnet 24 and held in place by locknut 23. Collar 25 is screwed downwardly onto bonnet 14 to hold upper bonnet 24 in place.

A preferred form of valve packing is shown in Fig. 1. This packing comprises chevron washers 30, which encircle stem 12 and which are compressed and held in place by packing sleeve 17. The chevron-shaped cross section of the washers 30 provides two downwardly directed pointed legs whose lower extremities fit tightly against the bonnet and valve stem surfaces. The legs of the lowermost washer 30 are wedged into the clearance space around washer 43 to provide additional sealing action. The tops of the washers 30 have a peaked shape to help direct the legs of the next higher washer tightly against the bonnet and stem surfaces. Packing sleeve 17 is turned downwardly within bonnet 14 on threads 29 to compress the washers 30 so that they are held tightly in place against each other and against the bonnet and stem walls. A locking ring 26 is used to hold packing sleeve 17 in place once it has turned to the point desired. Locking ring 26 has downwardly extending tongues 27 (Fig. 2) which are adapted to slide into slots 28 (Fig. 3) in packing sleeve 17. After packing sleeve 17 has been turned into position, locking ring 26 is placed in position on bonnet 14 with tongues 27 in slots 28, and it is then locked in position by tightening collar 25 on upper bonnet 24 and locking ring 26.

Another embodiment of the valve is shown in Fig. 5 in which O-rings are used to seal the valve bonnet. A hollow sleeve 50 is positioned within bonnet 51 about valve stem 12. A circular slot 54 in the outer surface of the hollow sleeve 50 contains an O-ring 52 to provide a seal between the inner wall of bonnet 51 and hollow sleeve 50. A circular slot 57 in the inner walls of hollow sleeve 50 contains an O-ring 56 between O-ring washers 55 to provide a seal between stem 12 and hollow sleeve 50.

Handle 20 is pivoted on pin 32 in a suitable slot 31 in the top of upper sleeve 22. Cooperating apertures 34 and 34a are provided in the handle 20 and the upper sleeve portion 22, respectively, so that a suitable pin may be slipped therethrough to lock the valve in its closed position. A stop 35 is provided on the end of the handle 20 to limit its swing in the vertical position.

Cam surface 21 is preferably shaped so that its contact point with stem 12a is slightly to the left (Fig. 4) of pivot 32 just before the handle 20 reaches its horizontal or fully closed position so that the upward force of stem 12a will at this point tend to move handle 20 to its horizontal or closed position and keep it there. This is preferably done by providing a flat portion 36 on the cam surface so that the distance indicated by line 42 of the pivot 32 from the lower edge of portion 36 is greater than the distance of the top edge indicated by line 41. In order to provide this contour for the cam surface 21, it is clear that stem 12a will be forced slightly farther down at a point just prior to the closing, such as when it is in contact with surface 21 adjacent line 42, than when it is in its final closed position adjacent line 41. It has been found that such a "jump back" of valve stem 12 may be tolerated in amounts of the order of .002 to .003 inch without impairing the contact between valve member 9 and seat 10.

The fit of washer 11 against the valve seat 10 when the valve is closed is adjusted initially and may be readjusted while the valve is in use to compensate for the wear of washer 11 by the adjustment of the threaded upper sleeve 22. Sleeve 22 is turned downwardly in upper bonnet 24 to increase the pressure of washer 11 on seat 10 or may be turned upwardly to decrease the washer 11 contact pressure.

By loosening the collar 25 on bonnet 14, the upper bonnet 24 may be rotated with respect to bonnet 14 to adjust the angular position of handle 20 in its closed or downward position. This adjustment of the handle position will be necessary during or after the adjustment of upper sleeve 22 to set the valve washer fit as described above or may be required to turn the handle 20 to a desired operating position, such as, for example, at right angles to the valve body 2, for a particular valve installation.

It can be seen that the present invention provides an improved cam-operated valve adapted to provide a quick-acting and positive fluid control device. The valve is especially suited for use with high pressure fluid systems and it automatically locks in its closed position so that it cannot be forced open by the fluid pressure. The valve also provides a leak-proof stem assembly, which, while allowing free reciprocal action of the stem, at the same time effectively prevents any fluid leakage around the stem, even in installations where extremely high fluid pressures are involved.

The cam valve is also readily adjustable to provide the desired amount of pressure between the valve stem and the valve seat in the closed position to insure a leakproof shut-off action. The closed position of the valve is also readily adjustable during the life of the valve to compensate for wear of the valve stem washer and of the valve seat. The angle of the valve handle with respect to the valve body is readily adjustable to accommodate the valve to any desired installation position.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

A packing means between a valve stem and a valve bonnet, said packing means comprising the combination of an annular resilient washer surrounding the valve stem, a plurality of chevron washers surrounding the valve stem having pointed legs facing in the direction of said annular resilient washer, one endmost chevron washer having its outer and inner pointed legs adjacent to the outer and inner edges of the annular washer, a packing sleeve adapted for being threadedly connected to the valve bonnet for adjustment axially of the valve stem and having one surface facing and engaging the chevron washer positioned most remotely from said annular resilient washer whereby said packing sleeve may be moved axially of the valve stem and against the chevron washers to compress them and to urge their pointed legs to spread outwardly against the valve stem and the valve bonnet, and means to lock the packing sleeve with respect to the valve bonnet comprising a locking ring surrounding the valve stem and slidably engaging the packing sleeve to prevent motion about the valve stem, and a fastening means to secure the locking ring to the valve bonnet.

References Cited in the file of this patent

UNITED STATES PATENTS

| | | |
|---|---|---|
| 1,216,348 | Murphy | Feb. 20, 1917 |
| 1,574,017 | Beattie | Feb. 23, 1926 |
| 1,609,879 | Messmer | Dec. 7, 1926 |
| 1,867,279 | Price | July 12, 1932 |
| 2,035,202 | Smith | Mar. 24, 1936 |
| 2,097,063 | Heller | Oct. 26, 1937 |
| 2,326,138 | Grant | Aug. 10, 1943 |
| 2,368,212 | Grant | Jan. 30, 1945 |
| 2,456,081 | Penicks | Dec. 14, 1948 |
| 2,456,623 | Cooper | Dec. 21, 1948 |
| 2,543,205 | Shoffner | Feb. 27, 1951 |
| 2,567,735 | Scott | Sept. 11, 1951 |
| 2,571,560 | Gall | Oct. 16, 1951 |
| 2,656,200 | Galliers | Oct. 20, 1953 |
| 2,783,811 | Cummaro | Mar. 5, 1957 |
| 2,791,194 | Janise | May 7, 1957 |

FOREIGN PATENTS

| | | |
|---|---|---|
| 428,336 | Great Britain | of 1935 |
| 520,181 | Great Britain | of 1940 |
| 661,584 | Great Britain | of 1951 |
| 486,425 | Canada | Sept. 9, 1952 |
| 483,015 | Italy | of 1953 |